(12) United States Patent
Mitrovic

(10) Patent No.: US 11,225,912 B2
(45) Date of Patent: Jan. 18, 2022

(54) GEAR ASSEMBLY FOR COAXIAL SHAFTS IN GAS TURBINE ENGINE

(71) Applicant: PRATT & WHITNEY CANADA CORP., Longueuil (CA)

(72) Inventor: Lazar Mitrovic, Longueuil (CA)

(73) Assignee: PRATT & WHITNEY CANADA CORP., Longueuil (CA)

(*) Notice: Subject to any disclaimer, the term of this patent is extended or adjusted under 35 U.S.C. 154(b) by 775 days.

(21) Appl. No.: 15/958,437

(22) Filed: Apr. 20, 2018

(65) Prior Publication Data

US 2019/0323436 A1    Oct. 24, 2019

(51) Int. Cl.
*F02C 7/36*    (2006.01)
*F02C 3/14*    (2006.01)
*F16H 57/02*   (2012.01)

(52) U.S. Cl.
CPC ............... *F02C 7/36* (2013.01); *F02C 3/145* (2013.01); *F05D 2230/60* (2013.01); *F05D 2260/4031* (2013.01); *F16H 2057/02021* (2013.01)

(58) Field of Classification Search
CPC .................................. F02C 3/107; F02C 7/36
See application file for complete search history.

(56) References Cited

U.S. PATENT DOCUMENTS

| | | | | |
|---|---|---|---|---|
| 2,393,098 A * | 1/1946 | Freeman | ................. | B23P 19/00 29/893.1 |
| 3,420,121 A * | 1/1969 | Stieg | ....................... | F16H 48/10 475/252 |
| 4,034,625 A * | 7/1977 | Taintor | ................... | B60W 10/02 475/291 |
| 4,251,987 A * | 2/1981 | Adamson | .................. | F02K 3/04 60/805 |
| 4,378,220 A * | 3/1983 | Seppala | .................... | F16D 3/00 464/55 |
| 5,152,668 A * | 10/1992 | Bulman | ..................... | F01D 7/00 416/129 |
| 5,154,580 A * | 10/1992 | Hora | ....................... | B64C 11/32 416/129 |
| 5,784,923 A * | 7/1998 | Kuehnle | .................. | F16H 1/30 475/345 |
| 6,264,138 B1 * | 7/2001 | Hawkins | ................ | B64D 35/00 244/60 |
| 6,855,089 B2 * | 2/2005 | Poulin | ....................... | F02C 7/36 475/331 |

(Continued)

FOREIGN PATENT DOCUMENTS

CA    2971056 A1    1/2018

*Primary Examiner* — Woody A Lee, Jr.
(74) *Attorney, Agent, or Firm* — Norton Rose Fulbright Canada LLP

(57) ABSTRACT

A gear assembly for a gas turbine engine has an input gear adapted to be secured to a turbine shaft. An output gear is adapted to be secured to a compressor shaft, the input gear and the output gear having the same number of teeth. A pair of idler gear shafts is provided, each said idler gear shaft having a first stage gear meshed with the input gear to be driven by the turbine shaft at a first stage of speed change. A second stage gear is axially spaced from the first stage gear and rotates with the first stage gear. The second stage gear is meshed with the output gear to drive the compressor shaft at a second stage of speed change. Landmarks are provided for aligning the gears during assembly in a desired orientation.

17 Claims, 4 Drawing Sheets

(56) References Cited

U.S. PATENT DOCUMENTS

| | | | |
|---|---|---|---|
| 8,209,952 B2 | 7/2012 | Ress, Jr. | |
| 9,033,673 B2* | 5/2015 | Roussille | F01D 5/147 |
| | | | 416/229 A |
| 9,045,992 B2* | 6/2015 | Roussille | C04B 35/571 |
| 9,062,562 B2* | 6/2015 | Coupe | F01D 9/02 |
| 9,068,629 B2* | 6/2015 | Sheridan | F01D 25/18 |
| 9,982,676 B2 | 5/2018 | Eifert et al. | |
| 10,808,624 B2* | 10/2020 | Dubreuil | F02C 3/107 |
| 2008/0060476 A1 | 3/2008 | Herlihy et al. | |
| 2009/0322088 A1* | 12/2009 | Dooley | F02C 7/275 |
| | | | 290/46 |
| 2014/0003932 A1* | 1/2014 | Knaack | F04D 29/403 |
| | | | 415/213.1 |
| 2014/0087907 A1* | 3/2014 | Coffin | F01D 25/18 |
| | | | 475/159 |
| 2016/0138603 A1 | 5/2016 | Eifert et al. | |
| 2016/0208690 A1 | 7/2016 | Zimmitti et al. | |
| 2017/0101936 A1 | 4/2017 | Marconi et al. | |
| 2017/0122221 A1 | 5/2017 | Marconi et al. | |
| 2017/0363198 A1* | 12/2017 | Mathieu | F02C 7/36 |
| 2018/0023482 A1 | 1/2018 | Lefebvre | |
| 2019/0170240 A1* | 6/2019 | Charrier | F16H 57/0427 |

\* cited by examiner

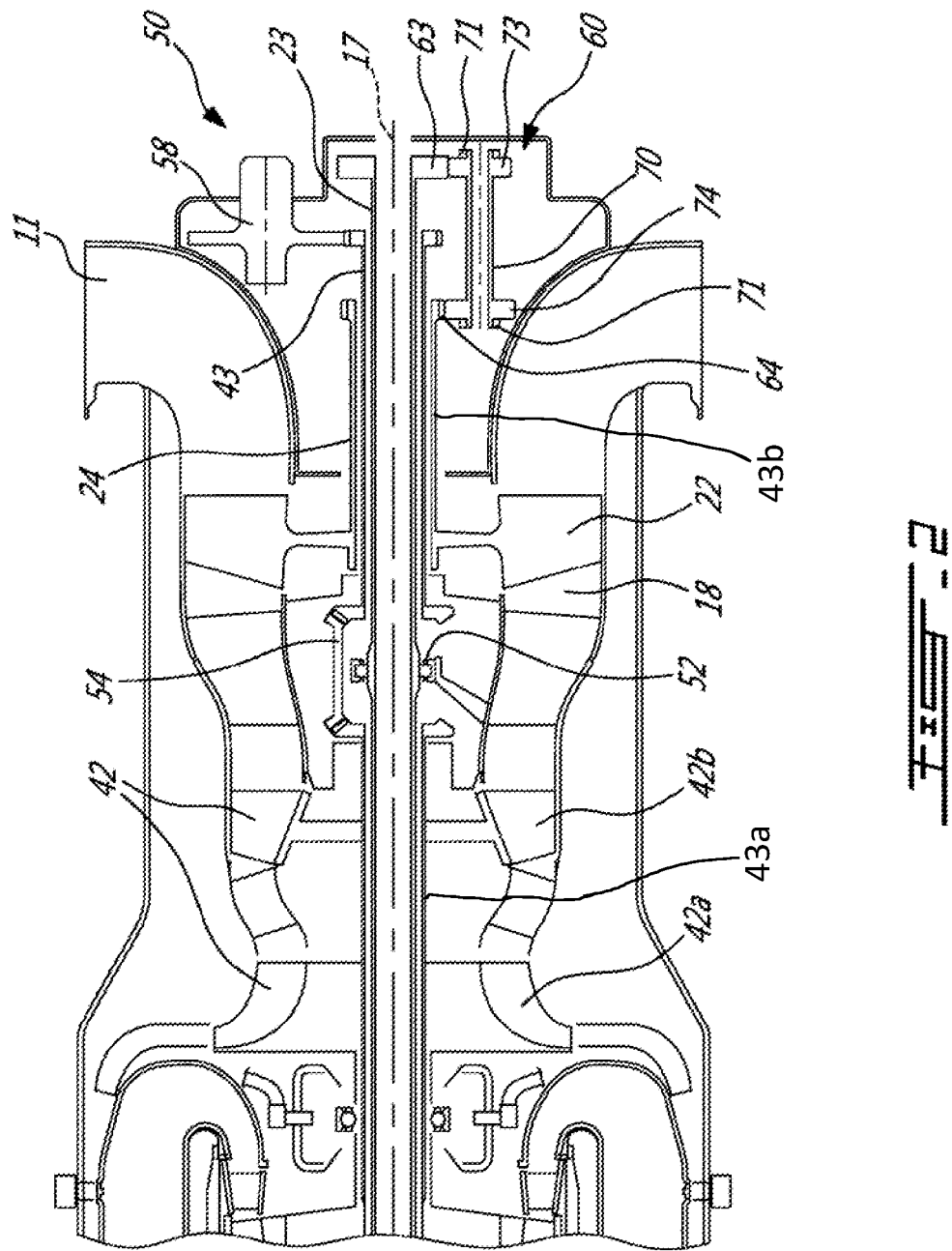

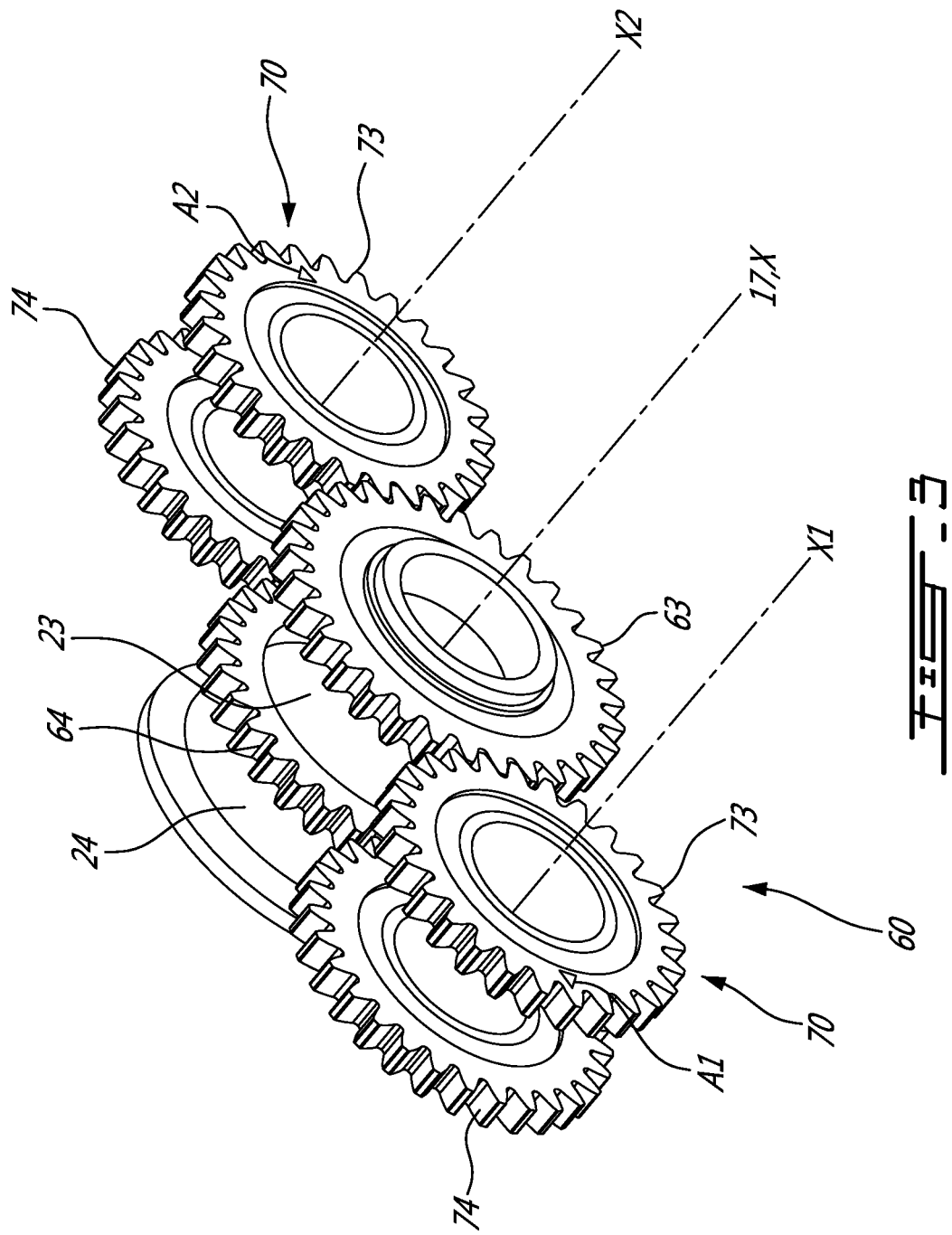

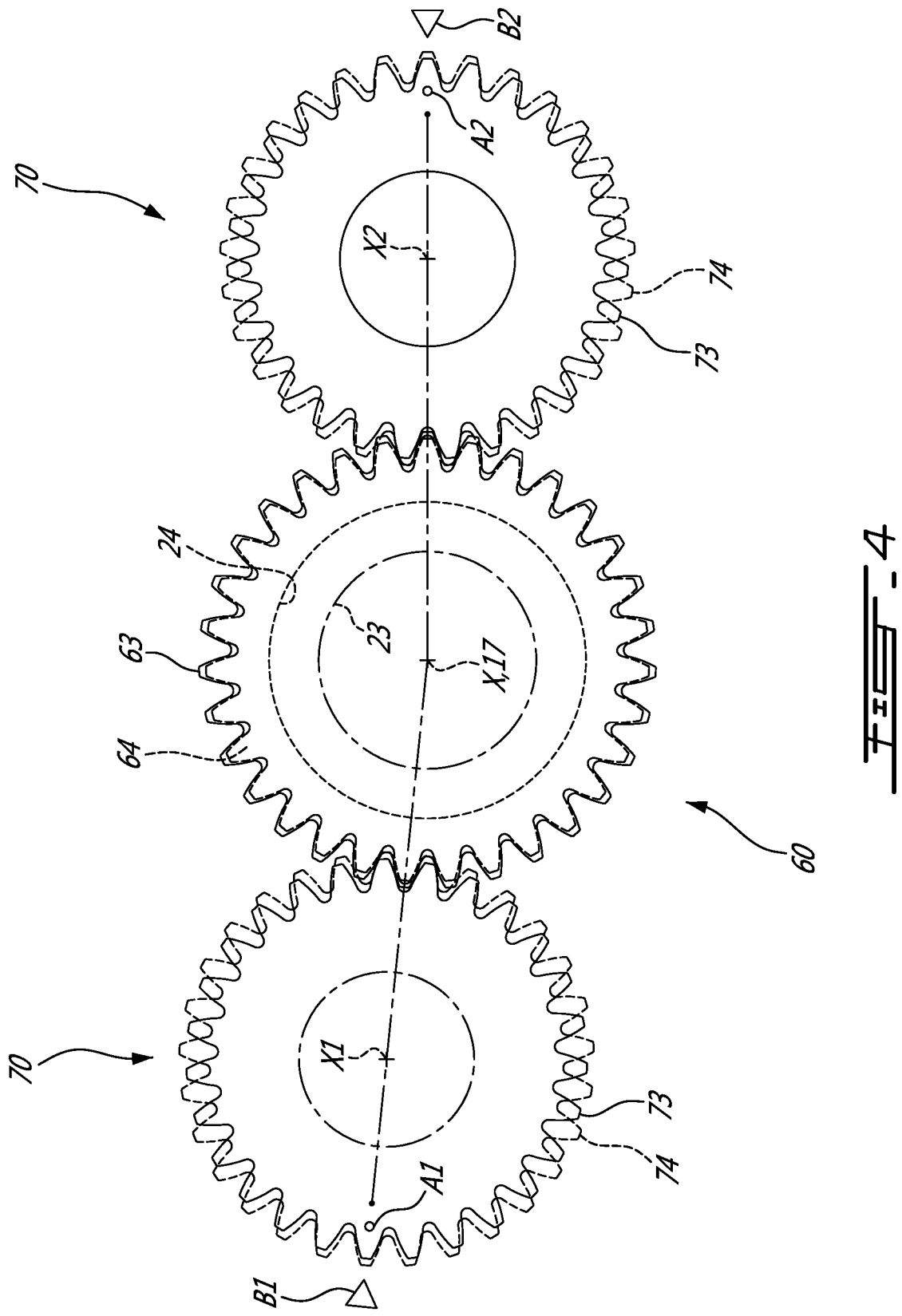

GEAR ASSEMBLY FOR COAXIAL SHAFTS IN GAS TURBINE ENGINE

TECHNICAL FIELD

The present disclosure relates to gear assemblies in gas turbine engines.

BACKGROUND OF THE ART

Gas turbine engines may have a twin-spool configuration. In a twin-spool configurations, a pair of shafts are coaxial and thus rotate about a common rotation axis, with one shaft mounted around another shaft. In some gas turbine engines, the shafts in a twin-spool configuration are coupled to another by a gear assembly, for transmission of torque from a driving shaft to a driven shaft. In such gas turbine engines, the gear assembly may create one or more stages of speed change, for example for the driven shaft to rotate at a greater speed than the drive shaft.

It may be desirable in some instances to increase the speed differential between shafts. However, space may be limited in gas turbine engines, and this may limit the selection of gear assemblies as some may be too voluminous, costly or complex. Another challenge lies in the installation of some types of gear assemblies, to avoid backlash between meshed gears, as this may affect gear durability.

SUMMARY

In accordance with an embodiment of the present disclosure, there is provided a gear assembly for a gas turbine engine, the assembly comprising: an input gear adapted to be secured to a turbine shaft, an output gear adapted to be secured to a compressor shaft, the input gear and the output gear having the same number of teeth, a pair of idler gear shafts, each said idler gear shaft having a first stage gear meshed with the input gear to be driven by the turbine shaft at a first stage of speed change, a second stage gear axially spaced from the first stage gear and rotating with the first stage gear, the second stage gear meshed with the output gear to drive the compressor shaft at a second stage of speed change, and landmarks for aligning the gears during assembly in a desired orientation.

In accordance with another embodiment of the present disclosure, there is provided a gas turbine engine comprising: a turbine shaft; a compressor shaft coaxial with the turbine shaft, with one shaft surrounding the other; and a gear assembly coupling the turbine shaft to the compressor shaft and including an input gear mounted to the turbine shaft, an output gear mounted to the compressor shaft, a pair of idler gear shafts, each said idler gear shaft having a first stage gear meshed with the input gear and configured to provide a first stage of speed change, idler gear shaft having a second stage gear axially spaced from the first stage gear and rotating with the first stage gear, the second stage gear meshed with the output gear and configured to provide a second stage of speed change, and landmarks for aligning the gear assembly into a desired alignment orientation during assembly of the gear assembly.

In accordance with yet another embodiment of the present disclosure, there is provided a method for assembling a gear assembly on coaxial twin shafts in a gas turbine engine, comprising: positioning a first idler gear shaft into meshing engagement with a gear on an outer shaft of the coaxial twin shafts; orienting the first idler gear shaft to a first unique predetermined orientation while meshed with the gear on the outer shaft; positioning a second idler gear shaft into a second unique predetermined orientation and into meshing engagement with the gear on the outer shaft while the first idler gear shaft is in said first unique predetermined orientation and meshed with the gear on the outer shaft; and installing a gear on an inner shaft of the coaxial twin shafts to reach a set alignment orientation with the idler gear shafts into said unique predetermined orientations.

DESCRIPTION OF THE DRAWINGS

Reference is now made to the accompanying figures in which:

FIG. 2 is an enlarged cross-section of the engine shown in FIG. 1 and illustrating a gear driven low pressure (LP) compressor and an axially mounted accessory gearbox (AGB) driven centrally through the LP compressor;

FIG. 3 is a perspective of a gear assembly for transmitting a drive between coaxial shafts in accordance with the present disclosure; and FIG. 4 is a face view of the gear assembly of FIG. 3 in a set alignment orientation.

DETAILED DESCRIPTION

Figure 1:
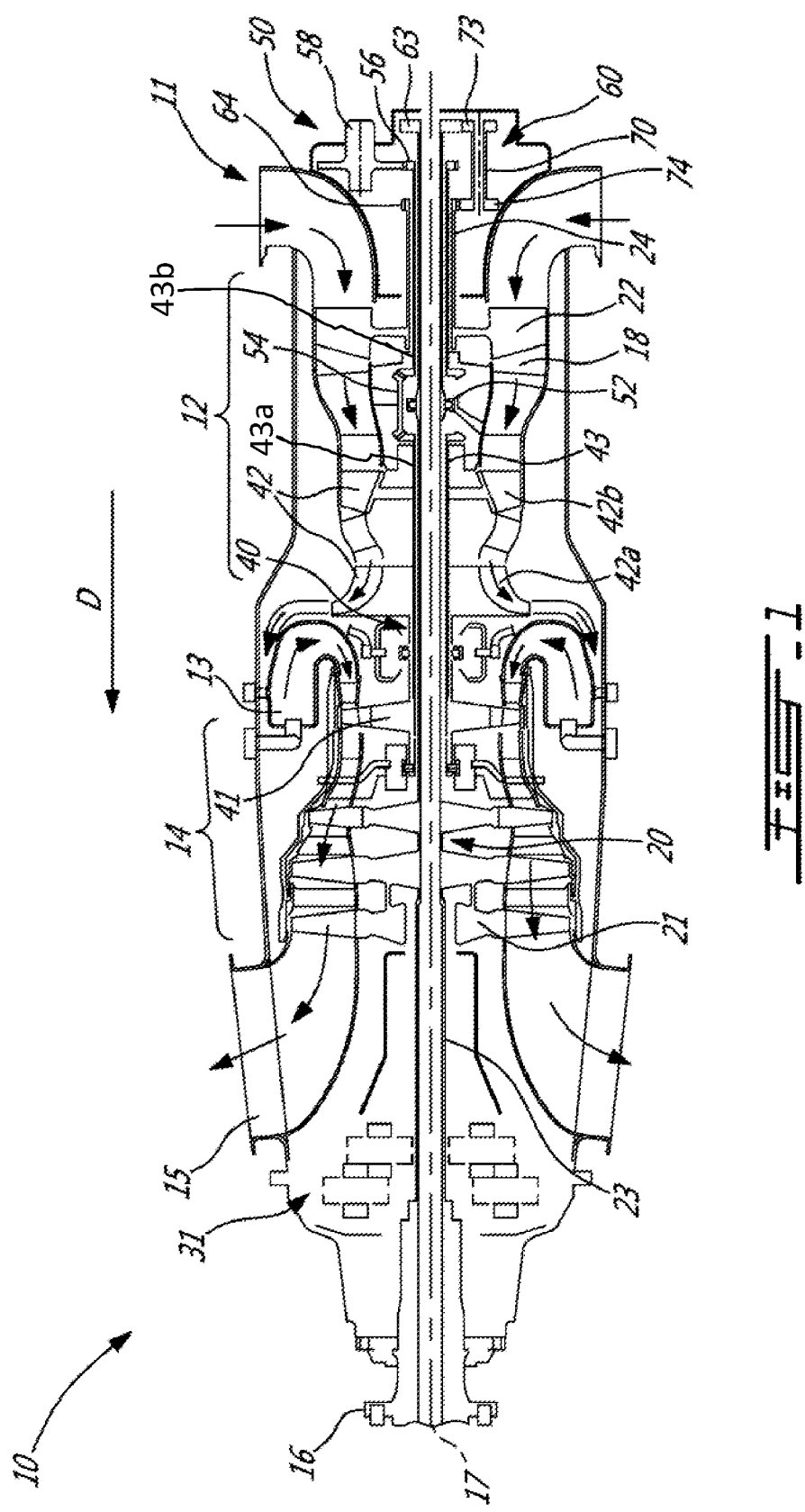
FIG. 1 is a schematic cross-sectional view of a multi-spool gas turbine engine.

FIG. 1 illustrates a gas turbine engine 10 of a type preferably provided for use in subsonic flight, generally comprising in serial flow communication an air inlet 11, a compressor section 12 for pressurizing the air from the air inlet 11, a combustor 13 in which the compressed air is mixed with fuel and ignited for generating an annular stream of hot combustion gases, a turbine section 14 for extracting energy from the combustion gases, an exhaust outlet 15 through which the combustion gases exit the engine 10. The engine 10 further has a drive output shaft 16 having a front end configured to drive a rotatable load (not shown). The rotatable load can, for instance, take the form of a propeller or a rotor, such as a helicopter main rotor. Depending on the intended use, the engine 10 can be configured as a turboprop engine or a turboshaft engine. FIG. 1 illustrates a turboprop configuration. The gas turbine engine 10 has a centerline or longitudinal center axis 17 about which the compressor and turbine rotors rotate.

The gas turbine engine 10 has an axially extending central core which defines a gaspath 18 through which gases flow, as depicted by flow arrows in FIG. 1. The exemplary embodiment shown in FIG. 1 is a "reverse-flow" engine because gases flow through the gaspath 18 from the air inlet 11 at a rear portion thereof, to the exhaust outlet 15 at a front portion thereof. This is in contrast to "through-flow" gas turbine engines in which gases flow through the core of the engine from a front portion to a rear portion. The direction of the flow of gases through the gaspath 18 of the engine 10 disclosed herein can be better appreciated by considering that the gases flow through the gaspath 18 in the same direction D as the one along which an aircraft engine travels during flight. Stated differently, in the non-limiting example shown in FIG. 1, gases flow through the engine 10 from a rear end thereof towards the output shaft 16.

It will thus be appreciated that the expressions "forward" and "aft" used herein refer to the relative disposition of components of the engine 10, in correspondence to the "forward" and "aft" directions of the engine 10 and aircraft including the engine 10 as defined with respect to the direction of travel. In the embodiment shown, a component of the engine 10 that is "forward" of another component is arranged within the engine 10 such that it is located closer to output shaft 16 (e.g. closer to the propeller in a turboprop application). Similarly, a component of the engine 10 that is "aft" of another component is arranged within the engine 10 such that it is further away from the output shaft 16.

Still referring to FIG. 1, the engine 10 has multiple spools which perform compression to pressurize the air received through the air inlet 11, and which extract energy from the combustion gases before they exit the gaspath 18 via the exhaust outlet 15. More particularly, the illustrated embodiment comprises a low pressure (LP) spool 20 and a high pressure (HP) spool 40 mounted for rotation about the engine axis 17. The LP and HP spools 20, 40 are independently rotatable about the axis 17. The term "spool" is herein intended to broadly refer to drivingly connected turbine and compressor rotors and is, thus, not limited to a compressor and turbine assembly on a single shaft. As observed from FIG. 1, it may also include a rotary assembly with multiple shafts geared together.

The LP spool 20 includes at least one component to compress the air that is part of the compressor section 12, and at least one component to extract energy from the combustion gases that is part of the turbine section 14. More particularly, the LP spool 20 has a LP turbine 21, also known as a power turbine, which may include different number of stages (three stages in the illustrated embodiment), and which drives a LP compressor 22 (also referred to as a boost). The LP turbine 21 drives the LP compressor 22, thereby causing the LP compressor 22 to pressurize incoming air from the air inlet 11. The LP compressor 22 is disposed just forward of the air inlet 11. Both the LP turbine 21 and the LP compressor 22 are disposed along the center axis 17. In the depicted embodiment, both the LP turbine 21 and the LP compressor 22 include rotatable components having an axis of rotation that is coaxial with the center axis 17. It is understood that they may include one or more stages depending upon the desired engine thermodynamic cycle.

The LP turbine 21 is forward of the LP compressor 22. The LP turbine 21 is also aft of the exhaust outlet 15. The LP compressor 22 is forward of the air inlet 11. This arrangement of the LP turbine 21 and the LP compressor 22 provides for a reverse-flow engine 10 that has one or more LP compressor stages located at the rear of the engine 10, and which are driven by one or more low pressure turbine stages located at the front of the engine 10.

The LP spool 20 further comprises a LP shaft 23 coaxial with engine axis 17. The LP turbine 21 is drivingly connected to the LP shaft 23. The LP shaft 23 allows the LP turbine 21 to drive the LP compressor 22 during operation of the engine 10. As will be discussed in greater details hereinbelow, the LP shaft 23 is drivingly coupled to the LP compressor 22 via a gear assembly coupling the LP shaft 23 to a LP compressor shaft 24, thereby allowing the LP compressor 22 to run at a different rotational speed from the LP turbine 21. This can provide more flexibility in the selection of design points for the LP compressor 22 while at the same time allowing to drivingly connect an axially mounted accessory gear box (AGB) to the HP spool 40 centrally through the LP compressor 22, thereby minimizing the engine envelope in a direction radial from the engine axis 17 as compared to conventional boosted engine with side-mounted AGBs driven via a tower shaft.

Still referring to FIG. 1, it can be appreciated that the LP shaft 23 extends axially forwardly from the LP turbine 21 for driving the output shaft 16. The LP shaft 23 is drivingly connected to the output shaft 16 via a suitable reduction gear box (RGB) 31. A rotatable load, a propeller (not shown) according to the illustrated example, is connectable to a front end of the output shaft 16. In this way, the LP turbine 21 can be used to drive the rotatable load (e.g. the propeller) at a reduced speed relative to the speed of the LP turbine 21. In such a configuration, during operation of the engine 10, the LP turbine 21 drives the rotatable load such that a rotational drive produced by the LP turbine 21 is transferred to the rotatable load via the LP shaft 23, the RGB 31 and the output shaft 16 coming out forwardly from the RGB 31. The rotatable load can therefore be any suitable component, or any combination of suitable components, that is capable of receiving the rotational drive from the LP turbine section 21.

The RGB 31 processes and outputs the rotational drive transferred thereto from the LP turbine 21 via the LP shaft 23 through known gear reduction techniques. The RGB 31 allows for the load (e.g. the propeller according to the illustrated turboprop example) to be driven at its optimal rotational speed, which is different from the rotational speed of the LP turbine 21. The RGB 31 is axially mounted at the front end of the engine 10. The RGB 31 has an input and an output axis parallel (coaxial in the illustrated embodiment) to the central axis 17 of the engine 10.

In an alternate embodiment where the engine 10 is a turboshaft, the rotational load (which may include, but is not limited to, helicopter main rotor(s) and/or tail rotor(s), propeller(s) for a tilt-rotor aircraft, pump(s), generator(s), gas compressor(s), marine propeller(s), etc.) is driven by the LP turbine 21 via the RGB 31, or the RGB 31 may be omitted such that the output of the engine 10 is provided directly by the LP shaft 23.

The LP shaft 23 with the portions thereof extending forward and aft of the LP turbine 21 provides the engine 10 with bidirectional drive. Modularity criteria for gas turbine engines may motivate the use of distinct shaft sections in opposed axial directions from the LP turbine 21. The LP shaft sections may be directly or indirectly connected together. Alternately, as shown in FIG. 1, the LP shaft 23 can be integral with a first portion of the LP shaft extending axially rearwardly from the LP turbine 21, and a second portion (a power turbine segment) extending between the RGB 31 and the LP turbine 21 forwardly from the LP turbine 21. Whether the LP shaft 23 is integral or segmented, the LP turbine 21 provides rotational drive outputted at each end of the LP shaft 23.

According to the non-limiting embodiment illustrated in FIG. 1, the LP shaft 23 is a one piece shaft and extends axially through a central bore of the LP compressor 22 to a location aft of the LP compressor 22 for connection with an axially mounted boost gear train disposed on an aft facing side of the LP compressor 22, as will discussed in further details hereinbelow. The use of such a one piece LP shaft 23 may allow the shaft to be introduced in the engine at the end of the assembly process in a single operation, thereby simplifying the assembly procedure. However, it is understood that the LP shaft 23 is not limited to the configuration depicted in FIG. 1. As mentioned above, instead of being provided in the form of a one-piece through-shaft, it could be divided into serially interconnectable sections.

In light of the preceding, it can be appreciated that the LP turbine 21 drives both the rotatable load and the LP compressor 22. Furthermore, the rotatable load, when mounted to the engine 10, and the LP compressor 22 are disposed on opposite ends of the LP turbine 21. It can thus be appreciated that one or more low pressure turbine stages are used to drive elements in front of the LP turbine (e.g., propeller, RGB 31, etc.) as well as to drive elements to the rear of the LP turbine (e.g., LP compressor 22). This configuration of the LP turbine 21 allows it to simultaneously drive the rotatable load and the LP compressor 22.

Still referring to FIG. 1, the HP spool 40 has at least one component to compress the air that is part of the compressor section 12, and at least one component to extract energy from the combustion gases that is part of the turbine section 14. The HP spool 40 is also disposed along the center axis 17 and includes a HP turbine 41 (also referred to as the compressor turbine) drivingly engaged (e.g., directly connected) to a HP compressor 42 by a HP shaft 43 rotating independently of the LP shaft 23. In the illustrated embodiment, the HP shaft 43 is a hollow shaft which rotates around the LP shaft 23. That is the LP shaft 23 extends axially through the HP shaft 43. The HP turbine 41 and the HP compressor 42 may include one or more stages of rotors, depending upon the desired engine thermodynamic cycle, for example. In the depicted embodiment, the HP compressor 42 includes a centrifugal compressor 42A or impeller and an axial compressor 42a, both of which are driven by the HP turbine 41. During operation of the engine 10, torque is transferred from HP turbine 41 to the HP compressor 42 via HP shaft 43.

In the exemplified reverse flow engine configuration, the HP turbine 41 is aft of the LP turbine 21, and forward of the combustor 13. The HP compressor 42 is aft of the combustor 13, and forward of the LP compressor 22. From this arrangement of the HP turbine 41 and the HP compressor 42, it can be appreciated that during operation of the engine 10, the LP compressor 22 driven by the LP turbine 21 feeds pressurized air to the HP compressor 42. Therefore, the pressurized air flow produced by the LP compressor 22 is provided to the HP compressor 42 and contributes to the work of both the LP turbine 21 and the HP turbine 41. This arrangement provides for a boosted reverse flow engine.

It can thus be appreciated that the presence of the above-described LP and HP spools 20, 40 provides the engine 10 with a "split compressor" arrangement. More particularly, some of the work required to compress the incoming air is transferred from the HP compressor 42 to the LP compressor 22. In other words, some of the compression work is transferred from the HP turbine 41 to the more efficient LP turbine 21. This transfer of work may contribute to higher pressure ratios while maintaining a relatively small number of rotors. In a particular embodiment, higher pressure ratios allow for higher power density, better engine specific fuel consumption (SFC), and a lower turbine inlet temperature (sometimes referred to as "T4") for a given power. These factors can contribute to a lower overall weight for the engine 10. The transfer of compression work from the HP compressor 42 to the LP compressor 22 contrasts with some conventional reverse-flow engines, in which the high pressure compressor (and thus the high pressure turbine) perform all of the compression work.

In light of the preceding, it can be appreciated that the LP turbine 21 is the "low-speed" and "low pressure" turbine section when compared to the HP turbine 41. The LP turbine 21 is sometimes referred to as the "power turbine". The turbine rotors of the HP turbine 41 spin at a higher rotational speed than the turbine rotors of the LP turbine 21 given the closer proximity of the HP turbine 41 to the outlet of the combustor 13. Consequently, the compressor rotors of the HP compressor 42 may rotate at a higher rotational speed than the compressor rotors of the LP compressor 22.

The HP turbine 41 and the HP compressor 42 can have any suitable mechanical arrangement to achieve the above-described split compressor functionality. For example, and as shown in FIG. 1, the HP shaft 43 extends concentrically about the LP shaft 23 and is independently rotatable relative thereto. The relative rotation between the HP shaft 43 and the LP shaft 23 allows the shafts 23, 43 to rotate at different rotational speeds, thereby allowing the HP compressor 42 and the LP compressor 22 to rotate at different rotational speeds. The HP shaft 43 can be mechanically supported by the LP shaft 23 using bearings or the like.

Still referring to the embodiment shown in FIG. 1, the engine 10 may also include an accessory gearbox (AGB) 50. The AGB 50 receives a rotational input from the HP spool 40 and, in turn, drives accessories (e.g. fuel pump, starter-generator, oil pump, scavenge pump, etc.) that contribute to the functionality of the engine 10. The AGB 50 can be designed with side-facing accessories, top-facing accessories, or rear-facing accessories depending on the installation needs.

According to the illustrated embodiment, the AGB 50 is concentrically mounted axially aft of the LP compressor 22 as an axial extension of the engine envelope. The axial positioning of the AGB 50 allows minimizing the overall radial envelope of the engine as compared to a split compressor or boosted engine having the AGB mounted on a side of the engine and connected to the HP spool via a tower shaft. In the illustrated embodiment, the AGB 50 is accommodated within the envelope of the engine in a plane to which the central axis 17 is normal.

In the illustrated embodiment, the AGB input drive axis is coaxial to the LP compressor centerline and, thus, the engine axis 17. By so aligning the input axis of the AGB 50 relative to the LP compressor centerline, the drive input to the AGB 50 can be provided centrally through the LP compressor 22, thereby eliminating the need for a tower shaft and an externally mounted gear arrangement. However, unlike conventional reverse flow engines (like the well-known PT6 engine manufactured by Pratt & Whitney Canada), which do not include a compressor boost, the presence of the LP compressor 22 axially between the HP compressor 42 and the AGB 50 physically interferes with the connection of the AGB 50 with the HP spool 40, which is disposed on the opposed axially facing side of the LP compressor 22. In the illustrated embodiment, this particular problem is overcome by extending the HP shaft 43 through a central bore or passage in the LP compressor 22. The HP shaft 43 thus provides a drive input to the AGB 50 coaxial to the engine axis 17. According to the embodiment illustrated in FIGS. 1 and 2, the HP shaft 43 is segmented between the HP compressor 42 and the LP compressor 22 to allow for the introduction of a bearing 52 mounted to a support to provide support to the LP shaft 23 between the HP compressor 42 and the LP compressor 22. A gear 54 is provided to drivingly couple the HP compressor shaft segment 43a of the HP shaft 43 to an AGB drive input shaft segment 43b, which may also be viewed as being an extension of the HP shaft 43. The gear 54 may be provided in the form of one or more bevel gears having a 1:1 speed ratio. As shown in FIG. 2, the bevel gear may be set to have a rotation axis perpendicular to the rotation axis of the HP shaft segments 43a, 43b. Such a gear arrangement allows for the installation of a support and bearing structure for supporting the LP shaft 23. Such a support may be suitable when the LP shaft 23 is provided in the form of a one-piece shaft or in order to address specific shaft dynamic requirements. It is however contemplated to position the bearing 52 elsewhere along the LP shaft 23, with the HP shaft 43 having a one-piece undisrupted configuration.

The AGB drive input shaft segment 43b projects axially into the AGB 50 and is provided at a distal end thereof with a gear 56, which is in meshing engagement with an associated AGB output gear 58. In the illustrated example, the AGB output gear 58 has a rotation axis parallel to the engine axis 17. The output gear 58 is drivingly connected to accessories (not shown). It is understood that the accessories gear train in the AGB 50 can adopt various configurations, including multiple outputs and different gear ratios, and the rotation axis may not be parallel to the engine axis 17.

Referring to FIGS. 2-4, a gear assembly 60 in accordance with the present disclosure is integrated in the AGB 50. The gear assembly 60 is configured to drivingly connect the LP shaft 23 that projects all the way to the aft end of the engine into the AGB 50, with the LP compressor shaft 24, in such a way that a speed differential is created between the shafts 23 and 24. In the illustrated embodiment, the gear assembly 60 may cause a greater rotational speed of the shaft 24 relative to the shaft 23.

The gear assembly 60 has input gear 63 that is secured to the LP shaft 23. The connection between the input gear 63 and the LP shaft 23 is embodied for example by a spline connection. Other connections are contemplated provided they can sustain the applicable torques, including a threaded connection, an integral connection, a monolithic connection, etc. The gear assembly 60 may also have an output gear 64 adapted to be secured to the driven LP compressor shaft 24 of the coaxial shafts 23 and 24, for being driven by the LP shaft 23 via the gear assembly 60. To assist in the alignment of the components of the gear assembly 60, the input gear 63 and the output gear 64 may have the same number of teeth and similar dimensions, as shown in FIG. 4 in which the input gear 63 and the output gear 64 are superposed.

Referring concurrently to FIGS. 1 to 4, a pair of idler gear shafts are each shown as 70 (only one is visible in FIGS. 1 and 2). The idler gear shafts 70 may be identical to one another, in size and gears. Each of the idler gear shafts 70 is supported by bearing(s) 71 (FIG. 2) to a structure of the gas turbine engine 10, such as a casing of the AGB 50. The bearings may be roller bearings, journal bearings with appropriate lubrication, etc. The bearings 71 may be axially fore and aft in the idler gear shafts 70 relative to the stage gears 73 and 74 described below. The idler gear shafts 70 operatively connect the input gear 63 to the output gear 64, so as to transmit the drive from one to another. Each of the idler gear shafts 70 has a first stage gear 73 meshed with the input gear 63 to receive a drive from the LP shaft 23. The first stage gear 73 is sized in relation to the input gear 63 to cause a first stage of speed change (increase or reduction) when meshed with the input gear 63. For example, the first stage gear 73 may be a pinion for the input gear 63, and hence rotate at a greater speed than a speed of rotation of the input gear 63.

The idler gear shafts 70 have a second stage gear 74 axially spaced from the first stage gear 73, with the axial spacing being relative to a direction parallel to the rotational axis 17, shown as X in FIGS. 3 and 4. In an embodiment, each idler gear shaft 70 is an integrally machined component (e.g., with a monolithic one-piece construction), and the spacing is sufficient to allow machining of the teeth of the gears 73 and 74, about rotational axes X1 and X2, each parallel to the rotational axis X of the shafts 23 and 24. The gears 73 and 74 consequently rotate integrally together. The second stage gear 74 is meshed with the output gear 64 to drive the LP compressor shaft 24. The meshing of the second stage gear 74 with the output gear 68 is such that a second stage of speed change occurs, in addition to the first stage of speed change. Accordingly, the speed differential between the drive shaft 23 and the driven shaft 24 is further affected by the second stage of speed change. In the illustrated embodiment, the compounded effect may be achieved by having a greater number of teeth in the second stage gear 74 than in the first stage gear 73. Other arrangements are possible to create two different stages. In some instances, it may be desired that the driven shaft 24 rotate at a lower speed than the drive shaft 23, and this will impact the dimensions, number of teeth, etc. of the gears of the gear assembly 60. In the illustrated embodiment, with the input gear 63 and the output gear 64 having the same number of teeth, the speed ratio is equal to the ratio of the gear 73 number of teeth over the gear 74 number of teeth. The same center distance of both stages is obtained by defining corresponding diametral pitches taking into consideration the transmitted torques.

The idler gear shafts 70 are paired to share the load resulting from the torque transmission. The idler gear shafts 70 may be at any appropriate location about the shafts 23 and 24. However, in the illustrated embodiment, the idler gear shafts 70 may be in diametrically opposed segments of the gears 63 and 64. The segments may be defined as having an angular value of $180°/Z$, wherein Z is the number of teeth of the input gear 63. The meshing of the idler gear shafts 70 in segments at an angular value of $180°/Z$ is one in which the idler gear shafts 70 are closest to being at 180° from one another. Such arrangement may be desired, in that the separating gear forces of meshed gears mostly cancel each other out with diametrical opposition. This may result in a reduction of radial loads on the shafts 23 and 24 and their bearings. As shown in FIG. 3, the input gear 63 has an odd number of teeth. Accordingly, for proper alignment of the gears 63 and 73, the axes X, X1 and X2, while parallel to one another, may not lie in a common plane. For example, in FIG. 4, the axis X2 is offset from the common plane of axes X and X1, by $180°/Z$. This may be viewed as arbitrary as it may be interpreted as the axis X1 being offset from a common plane of axes X and X2. In another embodiment, the gear 63 may have an even number of teeth and the axes X, X1 and X2 lie in a common plane.

The operational installation of the idler gear shafts 70 with the gears 63 and 64 on the shafts 23 and 24, respectively, is enabled by the presence of landmarks for each of the idler gear shafts 70. The landmarks may take various forms. The landmarks may be alignment markers A1 and B1 for the idler gear shaft 70 having the rotational axis X1, and markers A2 and B2 for the idler gear shaft 70 having the rotational axis X2. The landmarks may be temporary and erase over time, or may be permanent (machined, etched, carved, cast, etc.). The markers A1 and A2 (concurrently A) are on the first stage gears 73, while the markers B1 and B2 (concurrently B) are on an assembly fixture or jig or on the structure of the gas turbine engine 10, concurrently referred to as a structure around the idler gear shafts 70 or surrounding structure. The markers A may be on other parts of the idler gear shafts 70 as well, including the gears 74. However, in FIG. 4, the position of the markers A on the end faces of the gears 73 allows the markers A to be readily viewed during axial installation of the idler gear shafts 70. The markers A and B are positioned in assembly planning to minimize any backlash, and are therefore representative of an alignment orientation that is set (a set alignment orientation). The set alignment orientation is one in which the orientation of the gears of the gear assembly 60 are each in a unique orientation relative to the gas turbine engine 10 (i.e., angular orientation, angle of rotation relative to their rotational axes).

As the various structural components of the shafts 23 and 24, and the gear assembly 60 have been described, a method of assembling the multi spool of shafts 23 and 24 with the gear assembly 60 in the gas turbine engine is set forth. The method entails assembling the components in such a way that the assembly reaches at some point the set alignment orientation, to then minimize backlash during operation.

In an embodiment, the shafts 23 and 24 are installed in their coaxial spool configuration, as supported by bearings, with the HP shaft 43 in between in the arrangement of FIG. 1 (though other arrangements are possible, without the HP shaft 43). The output gear 64 is already on the shaft 24 or is fixed to the shaft 24.

One of the two idler gear shafts 70, for instance the one rotating about rotational axis X1, is moved axially into engagement with its bearing 71 and, simultaneously, the teeth of its gear 74 are meshed with the teeth of the output gear 64. If present, the other bearing 71 may be secured to the structure to block the idler gear shaft 70 into position, whereby the idler gear shaft 70 is idled and its gear 74 is meshed for rotation with the output gear 64 and shaft 24.

The gear 74 is then rotated to visually align its alignment marker A1 with the alignment marker B1 on the surrounding structure. Consequently, the idler gear shaft 70 rotating about axis X1 is in its individual set orientation, and the gear 64 on the shaft 24 is as well.

The other one of the idler gear shafts 70, the one rotating about rotational axis X2, is moved axially into engagement with its bearing 71 but having been oriented such that its alignment marker A2 is visually aligned with the alignment marker B2 on the surrounding structure. Consequently, the teeth of its gear 74 are meshed with the teeth of the output gear 64, with the idler gear shafts 70 and the output gear 64 being in their set alignment orientation. If present, the other bearing 71 may then be installed to block the idler gear shaft 70 into position. At the outset, the idler gear shaft 70 is idled and its gear 74 is meshed for rotation with the output gear 64 and shaft 24.

The input gear 63 is moved axially onto the shaft 23 for assembly, for its teeth to slide into engagement with the teeth of the first stage gears 73. The input gear 63 may be rotated on itself until it finds an orientation in which it may slide into meshed engagement with the first stage gears 73. A desired gear meshing is consequently achieved between the shafts 23, 24 and the gear assembly 60. The assembly may thus be used.

Although visual alignment guides A and B are shown and described, other devices or approaches may be used as landmarks to achieve the set alignment orientation during the assembly procedure. For example, a physical jig may be used as landmarks. Inertial sensors may also be on the idler gear shafts 70 as landmarks. For example, the inertial sensors may indicate when the set alignment orientation is reached, for instance through a calibration process. Each alignment marker A represents a unique orientation. A single gear 73 may have more than one alignment marker A. However, the alignment markers A must be related to a global set alignment orientation.

The parameters of the gears of the gear assembly 60 may in some instances follow some guidelines. For instance, to minimize backlash, the number of teeth in each idler gear shaft 70 may all be odd or may all be even. The number of teeth in the idler gear shafts 70 may be as a function of the required transmission ratio.

The method for assembling the gear assembly 60 on the coaxial shafts 23 and 24 in the gas turbine engine 10 may thus include: positioning a first idler gear shaft 70 into meshing engagement with a gear on an outer shaft of the coaxial shafts, in this case the gear 64 of the shaft 24; orienting the first idler gear shaft 70 to a first unique predetermined orientation while meshed with the gear 64 on the outer shaft 24; positioning a second idler gear shaft 70 into a second unique predetermined orientation and into meshing engagement with the gear 64 on the outer shaft 24 while the first idler gear shaft 70 is in said first unique predetermined orientation and meshed with the gear 64 on the outer shaft 24; and installing a gear, e.g., gear 63, on an inner shaft 23 of the coaxial shafts to reach a set alignment orientation with the idler gear shafts 70 into said unique predetermined orientations.

According to an embodiment, the gear assembly 60 features a single idler gear shaft 70, with the landmark A. The installation of such single idler gear shaft 70 is performed in the manner described above for the installation of the idler gear shaft 70 on axis X1, with the input gear 63 then installed in meshing engagement with the first stage gear 73 of the single idler gear shaft 70.

The above description is meant to be exemplary only, and one skilled in the art will recognize that changes may be made to the embodiments described without departing from the scope of the invention disclosed. The installation challenge of two-branch gear drive, i.e., the pair of idler gear shafts 70, is to ensure a meshing of gears with minimal tooth spacing error, and this may not be a problem for other type of gear drives. More than the pair of idler gear shafts 70 may be present as well. Technically, "backlash" is free play between teeth in mesh, affected by a spacing error. The difference created by a spacing error in turn affects the load sharing among teeth, and load sharing is an important factor in two-branch gear drives as in the present disclosure. A specific gas turbine engine 10 is shown in FIG. 1, but the gear assembly 60 and method of the present disclosure could be used with other types of engines featuring coaxial shafts, twin shafts, etc. Still other modifications which fall within the scope of the present invention will be apparent to those skilled in the art, in light of a review of this disclosure, and such modifications are intended to fall within the appended claims.

The invention claimed is:

1. A gear assembly for a gas turbine engine, the assembly comprising:
an input gear adapted to be secured to a turbine shaft,
an output gear adapted to be secured to a compressor shaft,
a pair of idler gear shafts, each said idler gear shaft having a first stage gear meshed with the input gear to be driven by the turbine shaft at a first stage of speed change, the first stage gears meshed with diametrically opposed segments of the input gear, a second stage gear axially spaced from the first stage gear and rotating with the first stage gear, the second stage gear meshed with the output gear to drive the compressor shaft at a second stage of speed change, a rotational axis of one of the idler gear shafts lying outside a plane in which lie a rotational axis of the other of the idler gear shaft and a rotational axis of the turbine and compressor shafts, and
landmarks for aligning the gears during assembly in a desired orientation.

2. The gear assembly according to claim 1, wherein the first stage gears have a lesser number of teeth than the second stage gears.

3. The gear assembly according to claim 1, wherein the input gear and the output gear have the same number of teeth.

4. The gear assembly according to claim 3, wherein the input gear and the output gear are the same.

5. The gear assembly according to claim 1, wherein the input gear and the output gear have the same odd number of teeth.

6. The gear assembly according to claim 5, wherein the same odd number of teeth is Z, and wherein the rotational axis of the one of the idler gear shaft lying outside said plane is in another plane incorporating the rotational axis of the turbine and compressor shafts and angled by 180°/Z from said plane.

7. The gear assembly according to claim 1, wherein the landmarks are defined by an alignment marker on each of the idler gear shafts, and corresponding alignment markers on a structure surrounding the idler gear shafts.

8. The gear assembly according to claim 7, wherein the alignment markers on the idler gear shafts are on the first stage gear.

9. A gas turbine engine comprising:
a turbine shaft;
a compressor shaft coaxial with the turbine shaft, with one shaft surrounding the other; and
a gear assembly coupling the turbine shaft to the compressor shaft and including an input gear mounted to the turbine shaft, an output gear mounted to the compressor shaft, a pair of idler gear shafts, each said idler gear shaft having a first stage gear meshed with the input gear and configured to provide a first stage of speed change, the first stage gears are meshed with diametrically opposed segments of the input gear, each said idler gear shaft having a second stage gear axially spaced from the first stage gear and rotating with the first stage gear, the second stage gear meshed with the output gear and configured to provide a second stage of speed change, a rotational axis of one of the idler gear shafts lying outside a plane in which lie a rotational axis of the other of the idler gear shaft and the rotational axis of the coaxial shafts, and
landmarks for aligning the gear assembly into a desired alignment orientation during assembly of the gear assembly.

10. The gas turbine engine according to claim 9, wherein the first stage gears have a lesser number of teeth than the second stage gears.

11. The gas turbine engine according to claim 9, wherein the input gear and the output gear have the same number of teeth.

12. The gas turbine engine according to claim 11, wherein the input gear and the output gear are the same.

13. The gas turbine engine according to claim 9, wherein the input gear and the output gear have the same odd number of teeth.

14. The gas turbine engine according to claim 13, wherein the same odd number of teeth is Z, and wherein the rotational axis of the one of the idler gear shaft lying outside said plane is in another plane incorporating the rotational axis of the coaxial shafts and angled by 180°/Z from said plane.

15. The gas turbine engine according to claim 9, wherein the landmarks are defined by an alignment marker on each of the idler gear shafts, and corresponding alignment markers on a structure of the gas turbine engine surrounding the idler gear shafts.

16. The gas turbine engine according to claim 15, wherein the alignment markers on the idler gear shafts are on the first stage gear.

17. The gas turbine engine according to claim 9, wherein the turbine shaft is a power turbine shaft, and the compressor shaft is a low-pressure compressor shaft.

\* \* \* \* \*